United States Patent
Li et al.

(10) Patent No.: US 11,202,226 B2
(45) Date of Patent: Dec. 14, 2021

(54) UPLINK DATA TRANSMISSION METHOD, TIMER CONFIGURATION METHOD, AND RELATED DEVICE

(71) Applicant: Huawei Technologies Co., Ltd., Shenzhen (CN)

(72) Inventors: Xiaoxian Li, Shenzhen (CN); Ping Fang, Shenzhen (CN); Yong Cheng, Shenzhen (CN); Gaokun Pang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 99 days.

(21) Appl. No.: 16/632,785

(22) PCT Filed: Sep. 5, 2018

(86) PCT No.: PCT/CN2018/104116
§ 371 (c)(1),
(2) Date: Jan. 21, 2020

(87) PCT Pub. No.: WO2019/047844
PCT Pub. Date: Mar. 14, 2019

(65) Prior Publication Data
US 2020/0169915 A1   May 28, 2020

(30) Foreign Application Priority Data

Sep. 7, 2017 (CN) .......................... 201710802052.4
Oct. 26, 2017 (CN) ........................ 201711018426.X

(51) Int. Cl.
*H04W 28/04* (2009.01)
*H04W 76/15* (2018.01)
*H04L 1/18* (2006.01)

(52) U.S. Cl.
CPC ............. *H04W 28/04* (2013.01); *H04L 1/188* (2013.01); *H04W 76/15* (2018.02)

(58) Field of Classification Search
CPC . H04W 76/15; H04W 28/04; H04W 28/0289; H04L 1/188
See application file for complete search history.

(56) References Cited

U.S. PATENT DOCUMENTS

| 9,706,418 B2 | 7/2017 | Decarreau et al. |
| 2015/0326745 A1 | 11/2015 | Dong |

(Continued)

FOREIGN PATENT DOCUMENTS

| CN | 103067641 A | 4/2013 |
| CN | 104519529 A | 4/2015 |

(Continued)

OTHER PUBLICATIONS

Machine Translation and Abstract of Chinese Publication No. CN104519529, Apr. 15, 2015, 26 pages.

(Continued)

*Primary Examiner* — Gary Mui
(74) *Attorney, Agent, or Firm* — Conley Rose, P.C.

(57) ABSTRACT

Embodiments of the present invention provide an uplink data transmission method, a timer configuration method, and a related device, where the uplink data transmission method is applied to a user equipment, and includes starting a timer when a first operation is performed on first data on a first transmission branch, and performing a third operation on second data when a second operation is not performed on the second data on a second transmission branch as timing of the tinier ends. Preprocessed data is allocated to two transmission branches by the user equipment.

20 Claims, 5 Drawing Sheets

(56) References Cited

U.S. PATENT DOCUMENTS

| | | | |
|---|---|---|---|
| 2016/0183158 A1* | 6/2016 | Decarreau | H04W 28/0205 |
| | | | 370/328 |
| 2016/0338132 A1 | 11/2016 | Uchino et al. | |
| 2017/0055176 A1* | 2/2017 | Xiao | H04W 28/0268 |
| 2017/0078918 A1 | 3/2017 | He | |
| 2018/0279173 A1* | 9/2018 | Loehr | H04W 28/065 |
| 2019/0386779 A1* | 12/2019 | Hong | H04L 5/0094 |
| 2020/0119976 A1* | 4/2020 | Xu | H04W 76/19 |
| 2021/0075710 A1* | 3/2021 | Wu | H04W 24/08 |

FOREIGN PATENT DOCUMENTS

| | | |
|---|---|---|
| CN | 104853382 A | 8/2015 |
| CN | 106416403 A | 2/2017 |
| WO | 2015119410 A1 | 8/2015 |

OTHER PUBLICATIONS

"3rd Generation Partnership Project; Technical Specification Group Services and System Aspects; Policy and charging control architecture (Release 14)," 3GPP TS 23.203, V14.4.0, Jun. 2017, 257 pages.

"3rd Generation Partnership Project; Technical Specification Group Services and System Aspects; General Packet Radio Service (GPRS) enhancements for Evolved Universal Terrestrial Radio Access Network (E-UTRAN) access (Release 15)," 3GPP TS 23.401, V15.0.0, Jun. 2017, 386 pages.

"3rd Generation Partnership Project; Technical Specification Group Services and System Aspects; System Architecture for the 5G System; Stage 2 (Release 15)," 3GPP TS 23.501, V1.2.0, Jul. 2017, 166 pages.

"3rd Generation Partnership Project; Technical Specification Group Services and System Aspects; Procedures for the 5G System; Stage 2 (Release 15)," 3GPP TS 23.502 V0.6.0, Aug. 2017, 148 pages.

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 14)," 3GPP TS 36.300, V14.2.0, Mar. 2017, 330 pages.

3rd Generation Partnership Project; Technical Specification Group Radio Access Network; Evolved Universal Terrestrial Radio Access (E-UTRA) and NR; Multi-connectivity; Stage 2 (Release 15), Jun. 2017, 43 pages.

Ericsson, "UL Split in Dual Connectivity," R2-1702749, 3GPP TSG-RAN WG2 #97bis, Spokane, USA, Apr. 3-7, 2017, 4 pages.

Ericsson, (Rapporteur), "UL Split in Dual Connectivity," Tdoc R2-1704381, 3GPP TSG-RAN WG2 #98, Hangzhou, China, May 15-19, 2017, 11 pages.

Samsung, "Remove the Uncessary Timers," R3-142861, 3GPP TSG-RAN WG3 #86, San Francisco, USA, Nov. 17-21, 2014, 11 pages.

* cited by examiner

US 11,202,226 B2

UPLINK DATA TRANSMISSION METHOD, TIMER CONFIGURATION METHOD, AND RELATED DEVICE

CROSS-REFERENCE TO RELATED APPLICATIONS

This application is a National Stage of International Patent Application No. PCT/CN2018/104116 filed Sep. 5, 2018, which claims priority to Chinese Patent Application No. 20170802052.4 filed Sep. 7, 2017 and Chinese Patent Application No. 201711018426.X filed on Oct. 26, 2017. All of the aforementioned applications are hereby incorporated by reference in their entireties.

TECHNICAL FIELD

The present invention relates to the communications field, and in particular, to an uplink data transmission method, a timer configuration method, user equipment, and a network device.

BACKGROUND

The 5th-Generation (5th-Generation, 5G) is multi-technology fusion communication that meets a wide range of requirements for data and connection services through alternations and innovations of technologies. It is proposed in third generation partnership project (Third Generation Partnership Project, 3GPP) RAN2 that to-be-transmitted data can be preprocessed. To be specific, user equipment (User Equipment, UE) can process a service data unit (service Data Unit, SDU) at a packet data convergence protocol (Packet Data Convergence Protocol, PDCP) layer as a PDCP protocol data unit (Protocol Data Unit, PDU) by, for example, performing encryption and/or an integrity check and adding a PDCP header; and send the PDCP PDU to a cache at a lower layer, such as a radio link control (Radio Link Control, RLC) layer. The RLC layer may further process the PDCP PDU as an RLC PDU. Further, the RLC layer may transmit the RLC PDU to a lower layer, such as a medium access control (Medium Access Control, MAC) layer. A MAC PDU may be further formed at the MAC layer. According to the foregoing manner, once receiving uplink scheduling, the UE can send the processed MAC PDU to a network device by using an air interface resource, thereby reducing processing time and improving a data transmission rate on a whole link.

However, in a dual-connectivity architecture, if the UE allocates preprocessed data to two transmission branches, possibly transmission on one transmission branch fails due to channel quality deterioration. Consequently, data is congested on the transmission branch for a long period, resulting in bad user experience.

SUMMARY

Embodiments of the present invention provide a data transmission method. In a dual-connectivity architecture, when UE allocates preprocessed data to two transmission branches, and transmission on one transmission branch fails due to channel quality deterioration, data can be prevented from being congested on the transmission path for a long period, thereby improving user experience.

According to a first aspect, an embodiment of the present invention provides an uplink data transmission method that is applied to user equipment, where the user equipment establishes protocol stack layers corresponding to a first transmission branch and a second transmission branch of a split bearer, the protocol stack layers include at least a PDCP layer, an RLC layer, and a MAC layer, and the method includes:

starting a timer when a first operation is performed on first data on the first transmission branch, where the first data is data that has been transmitted to the RLC layer and/or the MAC layer of the first transmission branch; and when timing of the timer ends, if a second operation is not performed on second data on the second transmission branch, performing a third operation on the second data, where the second data is data that has been transmitted to the RLC layer and/or the MAC layer of the second transmission branch.

With reference to the first aspect, in a first implementation of the first aspect, performing the first operation on the first data on the first transmission branch includes:

starting transmission of the first data on the first transmission branch; or completing transmission of the first data on the first transmission branch; or completing transmission of a part of the first data on the first transmission branch.

With reference to the first aspect, in a second implementation of the first aspect, that the second operation is not performed on the second data on the second transmission branch includes:

transmission of the second data is not completed on the second transmission branch; or transmission of the second data is not started on the second transmission branch; or transmission of a part of the second data is not completed on the second transmission branch.

With reference to the first aspect, in a third implementation of the first aspect, the performing a third operation on the second data includes:

canceling transmission of the second data; or deleting the second data; or canceling transmission of a part of the second data that has not yet been transmitted; or deleting a part of the second data that has not yet been transmitted.

With reference to the third implementation of the first aspect, in a fourth implementation of the first aspect, after the performing a third operation on the second data, the method further includes: transmitting a backup of the second data to the first transmission branch.

With reference to the first aspect, in a fifth implementation of the first aspect, the user equipment further establishes protocol stack layers corresponding to a third transmission branch of the split bearer, and the protocol stack layers include at least a PDCP layer, an RLC layer, and a MAC layer; and after the performing a third operation on the second data, the method further includes: transmitting a backup of the second data to the third transmission branch.

With reference to the third implementation of the first aspect, in a sixth implementation of the first aspect, the method further includes:

when the timing of the timer ends, if the second operation is performed on the second data on the second transmission branch, resetting the timer.

With reference to the first aspect, in a seventh implementation of the first aspect, before the starting a timer when a first operation is performed on first data on the first transmission branch, the method further includes:

receiving timer information sent by a network device, where the timer information includes duration information of the timer.

According to a second aspect, an embodiment of the present invention provides a timer configuration method that is applied to a network device, where the method includes:

determining duration of a timer, where the is used for transmission of uplink data of a split bearer of user equipment; and sending the duration of the timer to the user equipment, so that the user equipment performs a first operation on first data on a first transmission branch, and after the timer is started, if a second operation is not performed on second data on a second transmission branch before timing of the timer ends, performs a third operation on the second data, where the user equipment establishes protocol stack layers corresponding to the first transmission branch and the second transmission branch of the split bearer; the protocol stack layers include at least a PDCP layer, an RLC layer, and a MAC layer; the first data is data that has been transmitted to a lower protocol stack layer of the first transmission branch; the second data is data that has been transmitted to a lower protocol stack layer of the second transmission branch; and the lower protocol stack layer is the RLC layer and/or the MAC layer.

With reference to the second aspect, in a first implementation of the second aspect, the determining duration of a timer includes:

determining the duration of the timer based on a quality of service parameter of the uplink data; or determining the duration of the timer based on a quality of service parameter of a transmission path in which the uplink data is transmitted; or determining the duration of the timer based on feature information of the split bearer.

With reference to the second aspect, in a second implementation of the second aspect, the method further includes: sending a triggering condition for starting and/or stopping the timer to the user equipment.

With reference to the second aspect, in a third implementation of the second aspect, performing the first operation on the first data on the first transmission branch includes:

starting transmission of the first data on the first transmission branch; or completing transmission of the first data on the first transmission branch; or completing transmission of a part of the first data on the first transmission branch.

With reference to the second aspect, in a fourth implementation of the second aspect, that the second operation is not performed on the second data on the second transmission branch includes:

transmission of the second data is not completed on the second transmission branch; or transmission of the second data is not started on the second transmission branch; or transmission of a part of the second data is not completed on the second transmission branch.

With reference to the second aspect, in a fifth implementation of the second aspect, performing the third operation on the second data includes:

canceling transmission of the second data; or deleting the second data; or canceling transmission of a part of the second data that has not yet been transmitted; or deleting a part of the second data that has not yet been transmitted, According to a third aspect, an embodiment of the present invention provides user equipment, where the user equipment establishes protocol stack layers corresponding to a first transmission branch and a second transmission branch of a split bearer, the protocol stack layers include at least a PDCP layer, an RLC layer, and a MAC layer, and the user equipment includes:

a starting unit, configured to start a timer when a first operation is performed on first data on the first transmission branch, where the first data is data that has been transmitted to the RLC layer and/or the MAC layer of the first transmission branch; and an execution unit, configured to: when timing of the timer ends, if a second operation is not performed on second data on the second transmission branch, perform a third operation on the second data, where the second data is data that has been transmitted to the RLC layer and/or the MAC layer of the second transmission branch.

With reference to the third aspect, in a first implementation of the third aspect, performing the first operation on the first data on the first transmission branch includes:

starting transmission of the first data on the first transmission branch; or completing transmission of the first data on the first transmission branch; or completing transmission of a part of the first data on the first transmission branch.

With reference to the third aspect, in a second implementation of the third aspect, that the second operation is not performed on the second data on the second transmission branch includes:

transmission of the second data is not completed on the second transmission branch; or transmission of the second data is not started on the second transmission branch; or transmission of a part of the second data is not completed on the second transmission branch.

With reference to the third aspect, in a third implementation of the third aspect, the first execution unit is configured to: when timing of the timer ends, if the second operation is not performed on the second data on the second transmission branch, cancel transmission of the second data; or delete the second data; or cancel transmission of a part of the second data that has not yet been transmitted; or delete a part of the second data that has not yet been transmitted.

With reference to the third implementation of the third aspect, in a fourth implementation of the third aspect, the user equipment further includes a second execution unit, configured to transmit a backup of the second data to the first transmission branch after the first execution unit performs the third operation on the second data.

With reference to the third implementation of the third aspect, in a fifth implementation of the third aspect, the user equipment further establishes protocol stack layers corresponding to a third transmission branch of the split bearer, and the protocol stack layers include at least a PDCP layer, an RLC layer, and a MAC layer; and the user equipment further includes a second execution unit, configured to transmit a backup of the second data to the third transmission branch after the first execution unit performs the third operation on the second data.

With reference to the third aspect, in a sixth implementation of the third aspect, the user equipment further includes:

a resetting unit, configured to: when the timing of the tinier ends, if the second operation is performed on the second data on the second transmission branch, reset the timer.

With reference to the third aspect, in a seventh implementation of the third aspect, the user equipment further includes:

a receiving unit, configured to: before the starting unit starts the timer, receive timer information sent by a network device, where the timer information includes duration information of the timer.

According to a fourth aspect, an embodiment of the present invention provides a network device, including:

a determining unit, configured to determine duration of a timer, where the timer is used for transmission of uplink data of a split bearer of user equipment; and a first sending unit, configured to send the duration of the tinier to the user equipment, so that the user equipment performs a first operation on first data on a first transmission branch, and after the timer is started, if a second operation is not performed on second data on a second transmission branch before timing of the timer ends, performs a third operation on the second data, where the user equipment establishes protocol stack layers corresponding to the first transmission branch and the second transmission branch of the split bearer; the protocol stack layers include at least a PDCP layer, an RLC layer, and a MAC layer; the first data is data that has been transmitted to a lower protocol stack layer of the first transmission branch; the second data is data that has been transmitted to a lower protocol stack layer of the second transmission branch; and the lower protocol stack layer is the RLC layer and/or the MAC layer.

With reference to the fourth aspect, in a first implementation of the fourth aspect, the determining unit is configured to determine the duration of the timer based on a quality of service parameter of the uplink data; or determine the duration of the timer based on a quality of service parameter of a transmission path in which the uplink data is transmitted; or determine the duration of the timer based on feature information of the split bearer.

With reference to the fourth aspect, in a second implementation of the fourth aspect, the network device further includes:

a second sending unit, configured to send a triggering condition for starting and/or stopping the timer to the user equipment.

With reference to the fourth aspect, in a third implementation of the fourth aspect, performing the first operation on the first data on the first transmission branch includes:

starting transmission of the first data on the first transmission branch; or completing transmission of the first data on the first transmission branch; or completing transmission of a part of the first data on the first transmission branch.

With reference to the fourth aspect, in a fourth implementation of the fourth aspect, that the second operation is not performed on the second data on the second transmission branch includes:

transmission of the second data is not completed on the second transmission branch; or transmission of the second data is not started on the second transmission branch; or transmission of a part of the second data is not completed on the second transmission branch.

With reference to the fourth aspect, in a fifth implementation of the fourth aspect, performing the third operation on the second data includes:

canceling transmission of the second data; or deleting the second data; or canceling transmission of a part of the second data that has not yet been transmitted; or deleting a part of the second data that has not yet been transmitted.

According to a fifth aspect, an embodiment of the present invention provides user equipment, where the user equipment establishes protocol stack layers corresponding to a first transmission branch and a second transmission branch of a split bearer, the protocol stack layers include at least a PDCP layer, an RLC layer, and a MAC layer, and the user equipment includes:

a memory, configured to store an uplink data transmission instruction; and a processor, configured to invoke the uplink data transmission instruction in the memory and perform the following operations:

starting a timer when a first operation is performed on first data on the first transmission branch, where the first data is data that has been transmitted to the RLC layer and/or the MAC layer of the first transmission branch; and when timing of the timer ends, if a second operation is not performed on second data on the second transmission branch, performing a third operation on the second data, where the second data is data that has been transmitted to the RLC layer and/or the MAC layer of the second transmission branch.

With reference to the fifth aspect, in a first implementation of the fifth aspect, performing, by the processor, the first operation on the first data on the first transmission branch includes:

starting transmission of the first data on the first transmission branch; or completing transmission of the first data on the first transmission branch; or completing transmission of a part of the first data on the first transmission branch.

With reference to the fifth aspect, in a second implementation of the fifth aspect, that the processor does not perform the second operation on the second data on the second transmission branch includes:

transmission of the second data is not completed on the second transmission branch; or transmission of the second data is not started on the second transmission branch; or transmission of a part of the second data is not completed on the second transmission branch.

With reference to the fifth aspect, in a third implementation of the fifth aspect, the performing, by the processor, a third operation on the second data includes:

canceling transmission of the second data; or deleting the second data; or canceling transmission of a part of the second data that has not yet been transmitted; or deleting a part of the second data that has not yet been transmitted.

With reference to the third implementation of the fifth aspect, in a fourth implementation of the fifth aspect, after the processor performs the third operation on the second data, the processor is further configured to transmit a backup of the second data to the first transmission branch.

With reference to the third implementation of the fifth aspect, in a fifth implementation of the fifth aspect, the user equipment further establishes protocol stack layers corresponding to a third transmission branch of the split bearer, and the protocol stack layers include at least a PDCP layer, an RLC layer, and a MAC layer; and after the processor performs the third operation on the second data, the processor is further configured to transmit a backup of the second data to the third transmission branch.

With reference to the fifth aspect, in a sixth implementation of the fifth aspect, the processor is further configured to: when the timing of the tinier ends, if the second operation is performed on the second data on the second transmission branch, reset the timer.

With reference to the fifth aspect, in a seventh implementation of the fifth aspect, before the processor starts the timer when the first operation is performed on the first data on the first transmission branch, the processor is further configured to:

receive timer information sent by a network device, where the timer information includes duration information of the timer.

According to a sixth aspect, an embodiment of the present invention provides a network device, including:

a memory, configured to store a timer configuration instruction; and a processor, configured to invoke the timer configuration instruction in the memory and perform the following operations:

determining duration of a timer, where the timer is used for transmission of uplink data of a split bearer of user equipment; and sending the duration of the timer to the user equipment, so that the user equipment performs a first operation on first data on a first transmission branch, and after the timer is started, if a second operation is not performed on second data on a second transmission branch before timing of the timer ends, performs a third operation on the second data, where the user equipment establishes protocol stack layers corresponding to the first transmission branch and the second transmission branch of the split bearer; the protocol stack layers include at least a PDCP layer, an RLC layer, and a MAC layer; the first data is data that has been transmitted to a lower protocol stack layer of the first transmission branch; the second data is data that has been transmitted to a lower protocol stack layer of the second transmission branch; and the lower protocol stack layer is the RLC layer and/or the MAC layer.

With reference to the sixth aspect, in a first implementation of the sixth aspect, that the processor is configured to determine duration of a timer includes:

determining the duration of the timer based on a quality of service parameter of the uplink data; or determining the duration of the timer based on a quality of service parameter of a transmission path in which the uplink data is transmitted; or determining the duration of the timer based on feature information of the split bearer.

With reference to the sixth aspect, in a second implementation of the sixth aspect, the processor is further configured to send a triggering condition for starting and/or stopping the timer to the user equipment.

With reference to the sixth aspect, in a third implementation of the sixth aspect, performing the first operation on the first data on the first transmission branch includes:

starting transmission of the first data on the first transmission branch; or completing transmission of the first data on the first transmission branch; or completing transmission of a part of the first data on the first transmission branch.

With reference to the sixth aspect, in a fourth implementation of the sixth aspect, that the second operation is not performed on the second data on the second transmission branch includes:

transmission of the second data is not completed on the second transmission branch; or transmission of the second data is not started on the second transmission branch; or transmission of a part of the second data is not completed on the second transmission branch.

With reference to the sixth aspect, in a fifth implementation of the sixth aspect, performing the third operation on the second data includes:

canceling transmission of the second data; or deleting the second data; or canceling transmission of a part of the second data that has not yet been transmitted; or deleting a part of the second data that has not yet been transmitted.

According to a seventh aspect, an embodiment of the present invention provides a communications system, including the user equipment according to the third aspect or any implementation of the third aspect and the network device according to the fourth aspect or any implementation of the fourth aspect.

According to an eighth aspect, an embodiment of the present invention provides a chip, including a storage module, a processing module, and a communications interface, where the storage module is configured to store an instruction; and the processing module is configured to invoke the instruction stored in the storage module, and perform the uplink data transmission method according to the first aspect or any implementation of the first aspect.

According to a ninth aspect, an embodiment of the present invention provides a chip, including a storage module, a processing module, and a communications interface, where the storage module is configured to store an instruction; and the processing module is configured to invoke the instruction stored in the storage module, and perform the timer configuration method according to the second aspect or any implementation of the second aspect.

According to a tenth aspect, an embodiment of the present invention provides a computer-readable storage medium, configured to store one or more computer programs, where the one or more computer programs include an instruction; and when the computer program is run on a computer, the instruction is used to implement the uplink data transmission method according to the first aspect or any implementation of the first aspect.

According to an eleventh aspect, an embodiment of the present invention provides a computer-readable storage medium, configured to store one or more computer programs, where the one or more computer programs include an instruction; and when the computer program is run on a computer, the instruction is used to perform the timer configuration method according to the second aspect or any implementation of the second aspect.

According to a twelfth aspect, an embodiment of the present invention provides a computer program, where the computer program includes an instruction; and when the computer program is executed on a computer, the instruction is used to perform the uplink data transmission method according to the first aspect or any implementation of the first aspect.

According to a thirteenth aspect, an embodiment of the present invention provides a computer program, where the computer program includes an instruction; and when the computer program is executed on a computer, the instruction is used to perform the timer configuration method according to the second aspect or any implementation of the second aspect, According to a fourteenth aspect, an embodiment of the present invention provides a computer program product that includes a computer program, where when the computer program is executed on a computer, the computer is enabled to implement the uplink data transmission method according to the first aspect or any implementation of the first aspect.

According to a fifteenth aspect, an embodiment of the present invention provides a computer program product that includes a computer program, where when the computer program is executed on a computer, the computer is enabled to implement the tinier configuration method according to the second aspect or any implementation of the second aspect.

It can be learned that, according to the embodiments of the present invention, during transmission of the uplink data of the split bearer of the user equipment, when the UE allocates preprocessed data to two transmission branches, and transmission on one transmission branch fails due to channel quality deterioration, the third operation can be performed on data on the transmission branch. This prevents the data from being congested on the transmission branch for a long period, thereby improving user experience.

BRIEF DESCRIPTION OF DRAWINGS

To describe the technical solutions in the embodiments of the present invention or in the prior art more clearly, the following briefly describes the accompanying drawings required for describing the embodiments or the prior art.

DESCRIPTION OF EMBODIMENTS

The technical solutions according to embodiments of the present invention are clearly and completely described in the following with reference to the accompanying drawings.

Figure 1:
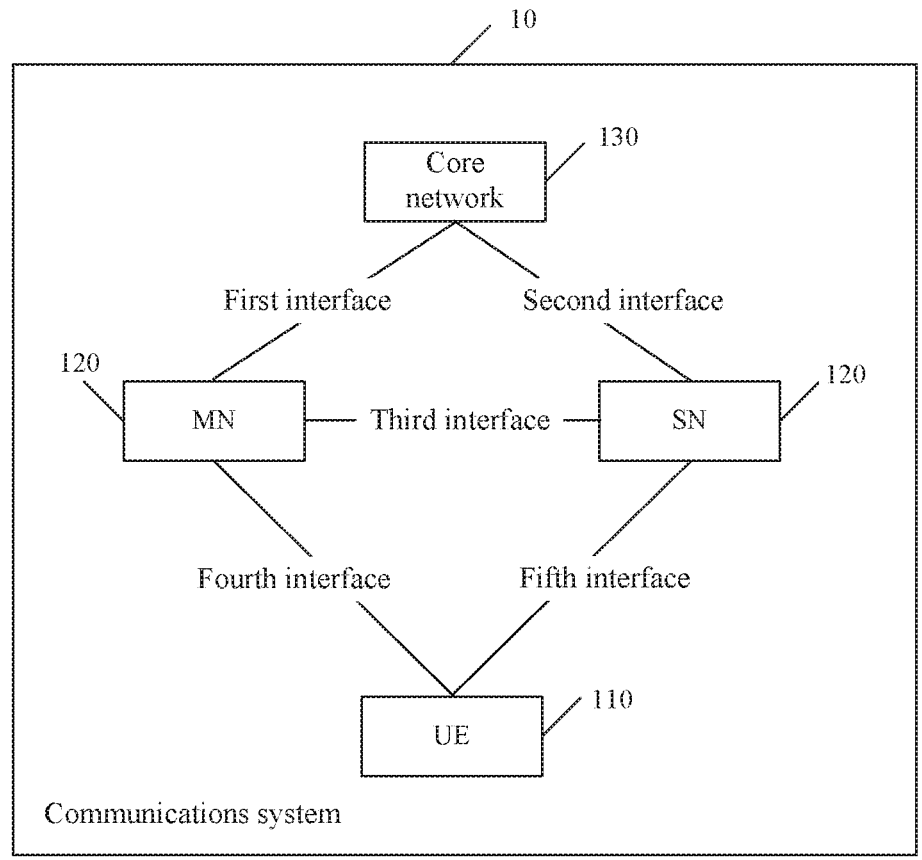
FIG. 1 is a schematic architectural diagram of a communications system according to an embodiment of the present invention.

Subsequently, refer to FIG. 1. FIG. 1 is a schematic architectural diagram of a communications system according to an embodiment of the present invention. As shown in FIG. 1, a communications system 10 may include at least UE 110, a master node (Master Node, MN), a secondary node (Secondary Node, SN), and a core network. In actual application, the communications system 10 may further include another device.

The UE may establish connections to two network nodes, that is, the MN and the SN. The MN interacts with the core network by using a first interface, the SN interacts with the core network by using a second interface, the MN interacts with SN by using a third interface, the MN interacts with the UE by using a fourth interface, and the SN interacts with the UE by using a fifth interface. Specifically, the fourth interface may be a Uu interface, and the fifth interface may be a Uu interface. In this embodiment of the present invention, a first node may be an MN or an SN. When the first node is an MN, a second node is an SN. Alternatively, when the first node is an SN, a second node is an MN.

The UE 110 may be an intelligent terminal such as a mobile phone or a smartwatch; or may be a communications device such as server, a gateway, a base station, or a controller; or may be an internet of things device such as a sensor, an electricity meter, or a water meter; or may be another device that can be accessed to a cellular network or a wired network.

The foregoing two network nodes may be network devices, for example, including but not limited to an evolved NodeB (evolved Node B, eNB), a next generation NodeB (Next Generation Node B, gNB), a transmission and reception point (Transmission and Reception Point, TRP), a cell, a central unit (Central Unit, CU), a distributed unit (Distributed Unit, DU), and the like. It should be noted that the network device described in following embodiments is the first node or the second node.

Based on the communications system described in FIG. 1, the following describes a schematic flowchart of a data transmission method according to an embodiment of the present invention with reference to FIG. 2 to FIG. 5.

Figure 2:
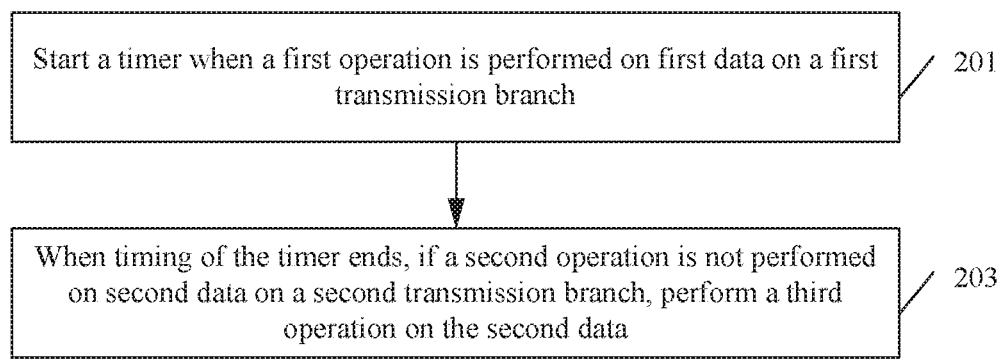
FIG. 2 is a schematic flowchart of an uplink data transmission method according to an embodiment of the present invention.

As shown in FIG. 2, the data transmission method may include at least the following steps.

S201: Start a timer when a first operation is performed on first data on a first transmission branch.

Specifically, according to the schematic architectural diagram of the communications system shown in FIG. 1, after establishing dual connections to the first node and the second node, the UE may further establish a split bearer split bearer. A transmission branch between the UE and the first node, corresponding to protocol stack layers of the split bearer, is a first transmission branch. A transmission branch between the UE and the second node, corresponding to protocol stack layers of the split bearer, is a second transmission branch. To-be-transmitted data may be classified into first data and second data. The first data is data that has been transmitted to an RLC layer and/or a MAC layer of the first transmission branch. The first data may be transmitted to the first node through the first transmission branch. The second data is data that has been transmitted to an RLC layer and/or a MAC layer of the second transmission branch. The second data may be transmitted to the second node through the second transmission branch.

Figure 3:
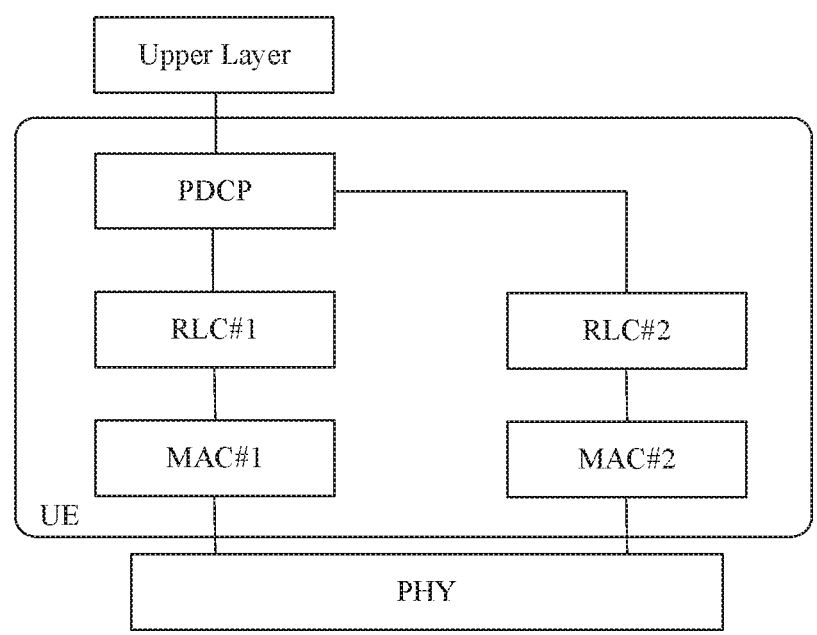
FIG. 3 is a schematic diagram of protocol stacks of a split bearer according to an embodiment of the present invention.

Specifically, the split bearer may be an MCG split bearer or an SCG split bearer. The split bearer includes a PDCP entity, two RLC entities respectively for the MN and the SN, and two MAC entities respectively for the first node and the second node. The PDCP entity, the RLC entities, and the MAC entities described in this embodiment of the present invention may be understood as function modules for implementing functions of a PDCP layer, the RLC layer, and the MAC layer; and may be deduced from or replaced with the PDCP layer, the RLC layer, and the MAC layer. The protocol stack of the split bearer is shown in FIG. 3. Protocol stack layers of the first transmission branch include at least a PDCP layer, an RLC #1 layer, and a MAC #1 layer. Protocol stack layers of the second transmission branch include at least the PDCP layer, an RLC #2 layer, and a MAC #2 layer. Encryption, an integrity check, header compression, and the like are performed on the data at the PDCP layer, and then the data is transmitted to the RLC layer and the MAC layer.

The first operation may include, but is not limited to the following three possible implementations.

In a first possible implementation, the first operation may be starting transmission of the first data to the first node on the first transmission branch.

Specifically, after transmission of the first data starts, the UE starts the timer, and timing begins.

Specifically, the UE may determine whether indication information indicating that transmission of any PDCP PDU in the first data succeeds and/or fails, for example, a PDCP status report PDCP STATUS report, is received. Alternatively, the UE may determine whether indication information of a lower protocol stack layer (for example, the RLC #1 or the MAC #1) indicating that transmission of any data in the first data has been started, is received. If the indication information is received, the UE determines that transmission of the first data to the first node on the first transmission branch has been started.

In a second possible implementation, the first operation may be completing transmission of the first data to the first node on the first transmission branch.

Specifically, after the transmission of the first data is completed, the UE starts the timer, and timing begins.

Specifically, determining, by the UE, that the transmission of the first data is completed may be receiving, by the UE, indication information, for example, a PDCP status report PDCP STATUS Report, that is returned by a peer end; and determining, based on the indication information, that PDCP PDUs associated with PDCP serial numbers (serial number, SN) in the first data are all successfully received. Alternatively, the transmission of the first data is completed may be that the PDCP layer of the UE receives response information of a lower protocol stack, where the response information indicates that the transmission of the first data is completed. For example, the PDCP layer receives first indication information of the RLC #1 layer, where the first indication information indicates that the transmission of the first data has been completed. Specifically, the RLC layer determines the first indication information based on second indication information of the MAC #1 layer, where the second indication information indicates that the first data has been transmitted on a wireless air interface, and hybrid automatic repeat request (Hybrid Automatic Repeat request, HARQ) information indicating successful transmission has been received. It should be noted that some of the PDCP PDUs may fail to be transmitted, but the UE may still consider that the first data is all transmitted. For example, when the PDCP PDU is mapped in an RLC unacknowledged mode (Unacknowledged Mode, UM), unsuccessful transmission of a part of the data does not affect user experience, and in this case, the UE can still determine that the transmission of the first data is completed.

In a third possible implementation, the first operation may be completing transmission of a part of the first data to the first node on the first transmission branch.

Specifically, after the transmission of a part of the first data is completed, the UE starts the timer, and timing begins. The part of the first data may be data of a particular data amount, or may be data associated with a particular PDCP SN number.

Specifically, the UE may determine whether indication information indicating that a particular quantity of PDCP PDUs in the first data are successfully transmitted, for example, a PDCP STATUS report, is received. Alternatively, the UE may determine whether indication information indicating that a PDCP PDU associated with the particular PDCP SN number in the first data is successfully transmitted, for example, a PDCP STATUS report, is received. Alternatively, the UE may determine whether indication information of a lower protocol stack layer (for example, the RLC #1 or the MAC #1), indicating that transmission of a particular quantity of PDCP PDUs in the first data is completed, is received. Alternatively, the UE may determine whether indication information of a lower protocol stack layer (for example, the RLC #1 or the MAC #1), indicating that transmission of the PDCP PDU associated with the particular PDCP SN number in a first data portion is completed, is received. If the indication information is received, the UE determines that transmission of a part of the data is completed on the first transmission branch. For example, if a part of the first data is 50% of the first data, when transmission of 50% of the first data is completed, the UE determines that transmission of a part of the data is completed on the first transmission branch. Alternatively, if a part of the first data is PDCP PDUs corresponding to 80% of PDCP SN numbers in an associated PDCP SN number set in the first data, when a quantity of SN numbers associated with PDCP PDUs in the first data that have been transmitted reaches 80% of total SN numbers associated with all PDCP PDUs in the first data, the UE determines that transmission of a part of the data is completed on the first transmission branch. Alternatively, when SN numbers associated with the PDCP PDUs in the first data that have been transmitted include a particular PDCP SN number, the UE determines that transmission of a part of the data is completed on the first transmission branch.

S203: When timing of the timer ends, if a second operation is not performed on second data on a second transmission branch, perform a third operation on the second data.

The second operation may include, but is not limited to the following three possible implementations.

In a first possible implementation, the second operation may be starting transmission of the second data to the second node on the second transmission branch.

Specifically, the UE may determine whether indication information indicating that transmission of any PDCP PDU in the second data succeeds and/or fails, for example, a PDCP STATUS report, is received. Alternatively, the UE may determine whether indication information of a lower protocol stack layer (for example, the RLC #2 or the MAC #2), indicating that transmission of any data portion in the second data has been started, is received. If the indication information is received, the UE determines that transmission of the second data is started on the first transmission branch.

In a second possible implementation, the second operation may be completing transmission of the second data to the second node on the second transmission branch.

Specifically, the UE may determine whether indication information, for example, a PDCP status report PDCP STATUS Report, that is returned by a peer end is received; and determine, based on the indication information, that PDCP PDUs associated with PDCP SN numbers in the second data are all successfully received. Alternatively, the PDCP layer of the UE may receive response information of a lower protocol stack layer (for example, the RLC #2 or the MAC #2), where the response information indicates that the transmission of the second data is completed. For example, the PDCP layer receives third indication information of the RLC #2 layer, where the third indication information indicates that the transmission of the second data has been completed. Specifically, the RLC #2 layer determines the third indication information based on fourth indication information of the MAC #2 layer, where the fourth indication information indicates that the second data has been transmitted on a wireless air interface, and HARQ information indicating successful transmission has been received. It should be noted that some of the PDCP PDUs may fail to be transmitted, but the UE may still consider that the second data is all transmitted. For example, when the PDCP PDU is mapped in an RLC UM (unacknowledged mode, unacknowledged mode) mode, unsuccessful transmission of a part of the data does not affect user experience, and in this case, the UE can still determine that the transmission of the second data is completed.

In a third possible implementation, the second operation may be completing transmission of a part of the second data to the second node on the second transmission branch.

Specifically, a part of the second data may be data of a particular data amount, or may be data associated with a particular PDCP SN number. Specifically, the UE may determine whether indication information indicating that a particular quantity of PDCP PDUs in the second data are successfully transmitted, for example, a PDCP STATUS report, is received. Alternatively, the UE may determine whether indication information indicating that a PDCP PDU associated with the particular PDCP SN number in the second data is successfully transmitted, for example, a PDCP STATUS report, is received. Alternatively, the UE may determine whether indication information of a lower protocol stack layer (for example, the RLC #2 or the MAC #2), indicating that transmission of a particular quantity of PDCP PDUs in the second data is completed, is received. Alternatively, the UE may determine whether indication information of a lower protocol stack layer (for example, the RLC #2 or the MAC #2), indicating that transmission of the PDCP PDU associated with the particular PDCP SN number in the second data is completed, is received. If the indication information is received, the UE determines that transmission of a part of the data is completed on the second transmission branch. For example, when a part of the second data is 50% of a second data portion, the UE determines that transmission of a part of the second data is completed on the second transmission branch. Alternatively, if a part of the second data is PDCP PDUs corresponding to 80% of PDCP SN numbers in an associated PDCP SN number set in the second data, when a quantity of SN numbers associated with PDCP PDUs in the second data that have been transmitted reaches 80% of total SN numbers associated with all PDCP PDUs in the second data, the UE determines that transmission of a part of the second data is completed on the second transmission branch. Alternatively, when SN numbers associated with the PDCP PDUs in the second data that have been transmitted include a particular PDCP SN number, the UE determines that transmission of a part of the second data is completed on the second transmission branch.

Specifically, when the timing of the timer ends, if the second operation is not performed on the second data on the second transmission branch, the third operation is performed on the second data.

The third operation may at least include, but is not limited to any one or more of the following four cases.

In a first case, the third operation may be canceling transmission of the second data to the second node.

Specifically, the UE may instruct a lower protocol stack layer of the second transmission branch to cancel the transmission of the second data.

In a second case, the third operation may be deleting the second data.

Specifically, the UE may instruct a lower protocol stack layer of the second transmission branch to delete the second data.

It may be learned that the third operation may be alternatively canceling the transmission of the second data to the second node and deleting the second data.

In a third case, the third operation may be canceling transmission of a part of the second data that has not yet been transmitted.

Specifically, the UE may instruct a lower protocol stack layer of the second transmission branch to cancel the transmission of a part of the second data that has not yet been transmitted. The part of the second data may be data of a particular data amount, or may be data associated with a particular PDCP SN number.

In a fourth case, the third operation may be deleting a part of the second data that has not yet been transmitted.

Specifically, the UE may instruct a lower protocol stack layer of the second transmission branch to delete a part of the second data that has not yet been transmitted. The part of the second data may be data of a particular data amount, or may be data associated with a particular PDCP SN number.

It may be learned that the third operation may be alternatively canceling transmission of a part of the second data that has not yet been transmitted and deleting the part of the second data.

Specifically, performing, by the UE, the third operation on the second data may be instructing, by the UE by using the PDCP layer, a lower protocol stack layer of the second transmission branch to perform the third operation on the second data. For example, the PDCP layer instructs the RLC #2; or the PDCP layer instructs the RLC #2, and then the RLC #2 instructs the MAC #2; or the PDCP layer instructs the MAC #2, where the protocol stack layer instructed by the PDCP layer of the UE may be a protocol stack layer at which preprocessed data is located.

According to this embodiment of the present invention, during transmission of the uplink data of the split bearer of the user equipment, when the UE allocates preprocessed data to two transmission branches, and transmission on one transmission branch fails due to channel quality deterioration, a transmission time difference between the two transmission branches can be controlled by the timer, and the third operation is performed on data on the transmission branch. This prevents data from being congested on the transmission branch for a long period, thereby improving user experience.

It may be understood that in this embodiment of the present invention, alternatively, the timer may be started when the first operation is performed on the second data on the second transmission branch; and when the timing of the timer ends, if the second operation is not performed on the first data on the first transmission branch, the third operation is performed on the first data.

Figure 4:
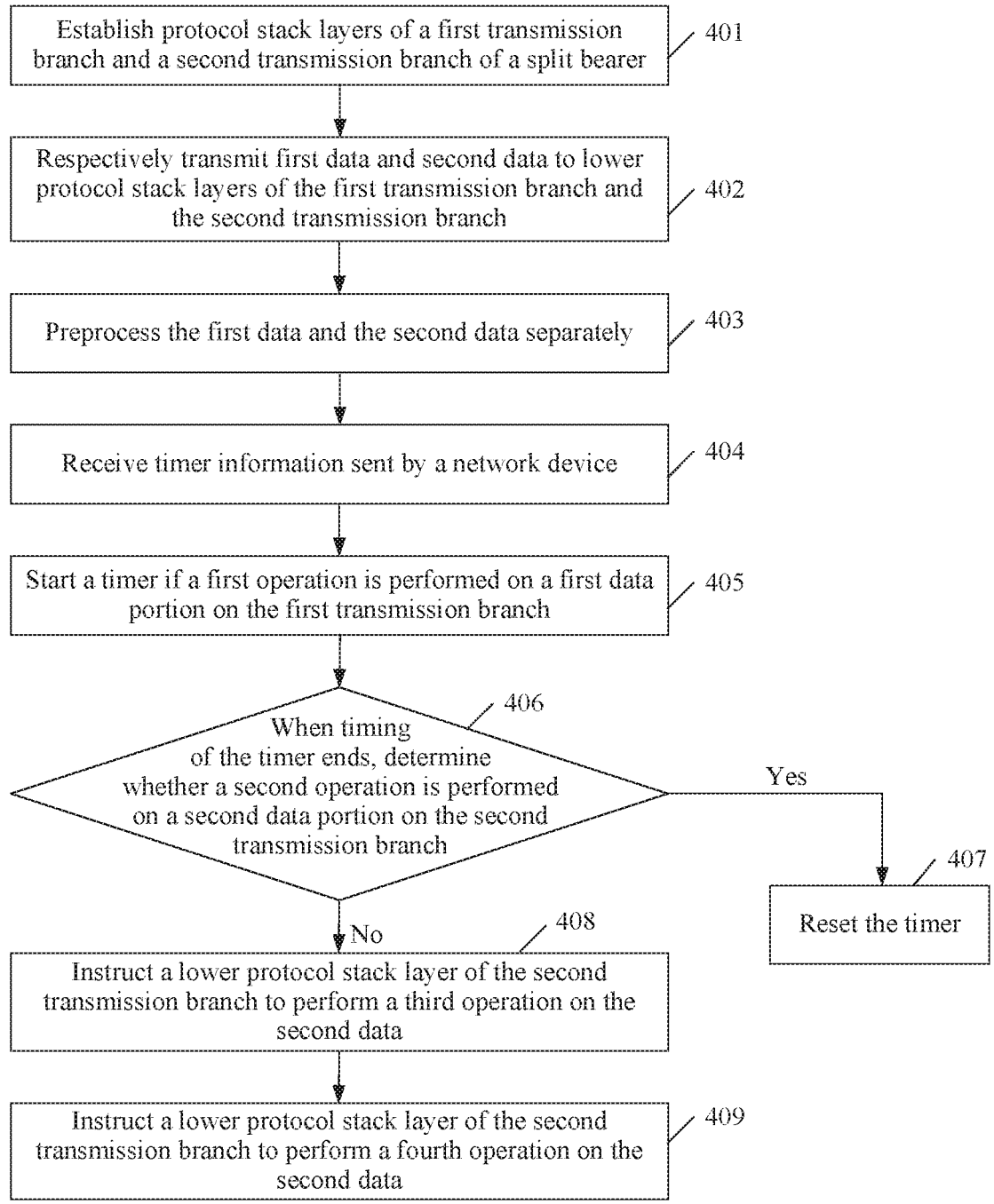
FIG. 4 is a schematic flowchart of an uplink data transmission method according to another embodiment of the present invention.

Subsequently, refer to FIG. 4. FIG. 4 is a schematic flowchart of another uplink data transmission method according to an embodiment of the present invention. As shown in FIG. 4, the uplink data transmission method may include the following steps.

S401: Establish protocol stack layers of a first transmission branch and a second transmission branch of a split bearer.

Specifically, according to the schematic architectural diagram of the communications system shown in FIG. 1, after establishing dual connections to the first node and the second node, the UE may further establish a split bearer split bearer. A transmission branch between the UE and the first node, corresponding to protocol stack layers of the split bearer, is a first transmission branch. A transmission branch between the UE and the second node, corresponding to protocol stack layers of the split bearer, is a second transmission branch. To-be-transmitted data may be classified into first data and second data. The first data is data that has been transmitted to an RLC layer and/or a MAC layer of the first transmission branch. The first data may be transmitted to the first node through the first transmission branch. The second data is data that has been transmitted to an RLC layer and/or a MAC layer of the second transmission branch. The second data may be transmitted to the second node through the second transmission branch.

Specifically, the split bearer may be a master cell group (Master Cell Group, MCG) split bearer or a secondary cell group (Secondary Cell Group, SCG) split bearer. The split bearer includes a PDCP entity, two RLC entities respectively for the MN and the SN, and two MAC entities respectively for the first node and the second node. The PDCP entity, the RLC entities, and the MAC entities described in this embodiment of the present invention may be understood as function modules for implementing functions of a PDCP layer, the RLC layer, and the MAC layer; and may be deduced from or replaced with the PDCP layer, the RLC layer, and the MAC layer. The protocol stack of the split bearer is shown in FIG. 3. Protocol stack layers of the first transmission branch include at least a PDCP layer, an RLC #1 layer, and a MAC #1 layer. Protocol stack layers of the second transmission branch include at least the PDCP layer, an RLC #2 layer, and a MAC #2 layer. Encryption, an integrity check, header compression, reordering, and the like are preformed on the data at the PDCP layer, and then the data is transmitted to the RLC layer and the MAC layer.

S402: Respectively transmit first data and second data to lower protocol stack layers of the first transmission branch and the second transmission branch.

S403: Preprocess the first data and the second data separately.

It should be noted that an implementation order of S402 and S403 is not strictly limited, and possibly S402 and S403 are implemented alternately. Specifically, the first data and the second data may be data in a transmission path or in a first data flow, or may be PDCP SDUs or PDCP PDUs. When the first data and the second data are PDCP SDUs, preprocessing the first data and the second data may at least include adding the PDCP SDUs to PDCP PDUs; and specifically, may at least include allocating corresponding PDCP SN numbers to the PDCP SDUs, and adding PDCP headers. The PDCP SN numbers of the first data and the second data may be different, or may be the same (for example, in a scenario in which PDCPs are repeated), or may be partly the same. This is not limited in the present invention. Respectively transmitting the first data and the second data to the lower protocol stack layers of the first transmission branch and the second transmission branch may be transmitting the first data to the RLC layer or the MAC layer of the first transmission branch, and transmitting the second data to the RLC layer or the MAC layer of the second transmission branch. In this case, preprocessing the first data and the second data may further include adding the first data and the second data to an RLC PDU or a MAC PDU. In actual application, extents for preprocessing the first data and the second data are not limited.

S404: Receive tinier information sent by a network device.

Specifically, the network device may be the first node or the second node.

Figure 5:
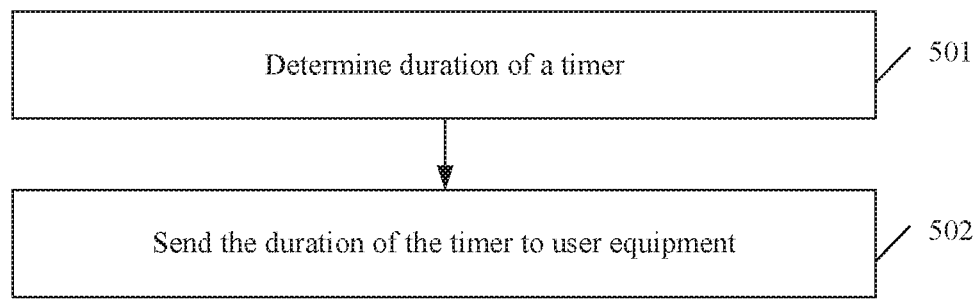
FIG. 5 is a schematic flowchart of a timer configuration method according to an embodiment of the present invention.

Subsequently, a method for configuring a timer for the user equipment by the network device is described in detail. Descriptions are made by using an example in which the network device is the first node. As shown in FIG. 5, the timer configuration method may include the following steps.

S501: Determine duration of a timer.

Specifically, the duration of the timer may be determined according to the following methods.

In a first method, the duration of the timer is determined based on a quality of service parameter of uplink data.

In a second method, the duration of the timer is determined based on a quality of service parameter of a transmission path in Which the uplink data is transmitted.

Specific implementation processes of the foregoing two methods for determining the duration of the timer are as follows.

First, a transmission path of the first data flow is established between the UE and the core network.

The first data flow may be, but is not limited to one or more of a service data flow (Service data flow, SDF), an SDF aggregate (SDF Aggregate), a data flow (data flow), a service data flow (service data flow), a quality of service flow (QoS flow), a packet flow (packet flow), and the like. Correspondingly, the transmission path of the first data flow may be, but is not limited to an evolved packet system bearer (Evolved Packet System Bearer, EPS Bearer), an evolved radio access bearer (Evolved Radio Access Bearer. E-RAB), a PDU session (PDU Session), or the like. For a specific process, refer to relevant standards such as the 3GPP TS 23.401 standard, the 3GPP TS 23.501 standard, and the 3GPP TS 23.502 standard. Details are not described in the present invention.

Second, the first node receives a first message and determines first timer duration based on the first message.

In a first possible implementation, the first message carries feature information of the transmission path of the first data flow. The feature information of the transmission path of the first data flow may include, but is not limited to identification information of the transmission path and quality of service (Quality of Service, QoS) parameter information of the transmission path. Further, the first message may further carry feature information of the first data flow, such as identification information of the first data flow and QoS parameter information of the first data flow.

The identification information of the first data flow may be, but is not limited to a service identifier (service identifier, service ID), an SDF ID, an SDF Aggregate ID, a data flow ID, a service data flow ID, a QoS flow ID, a packet flow ID, or the like. Correspondingly, the identification information of the transmission path of the first data floe may be, but is not limited to an EPS bearer ID, an E-RAB ID, a PDU Session ID, or the like. The QoS parameter information of the first data flow may include, but is not limited to one or more of a scale value (QoS Class Identifier, QCI), an allocation and retention priority (Allocation and Retention Priority, ARP), a guaranteed bit rate (Guaranteed Bit Rate, GBR), a maximum bit rate (Maximum Bit Rate, MBR), a 5G QoS class indicator (5G QoS Indicator 5QI), a guaranteed flow bit rate (Guaranteed Flow Bit Rate, GFBR), a maximum flow bit rate (Maximum Flow Bit Rate, MFBR), notification control notification control, and the like of the first data flow. For specific definitions, refer to the 3GPP TS 23.203 standard and the 3GPP TS 23.501 standard. Details are not described herein. The QoS parameter information of the transmission path may include, but is not limited to one or more of a. QCI, an ARP, a GBR, an MBR, a 5QI, a GFBR, an MFBR, notification control, and the like of the transmission path. For specific definitions, refer to the 3GPP TS 23.401 standard and the 3GPP TS 23.501 standard. It should be noted that the QoS parameter information of the transmission path of the first data flow may further include the QoS parameter information of the first data flow. Persons skilled in the art may understand that in some scenarios, QoS feature information of the first data flow may be substantially deduced from QoS feature information of the transmission path of the first data flow. Specifically, when applied to an EN-DC scenario, the transmission path of the first data flow may be an E-RAB, a plurality of SDFs may be transmitted in the transmission path, and QoS parameters of the SDFs in the E-RAB may be substantially similar or the same.

Specifically, when applied to an MR-DC with NGC, the transmission path of the first data flow may be a PDU session, and a plurality of QoS flows may be transmitted in the transmission path. In this scenario, a QoS parameter of the QoS flow may be different from a QoS parameter at a PDU session level. The duration of the timer may be determined by the second node based on the QoS parameter information of the transmission path of the first data flow. For example, the duration of the timer is determined based on one or more of the following parameters indicated by the QoS parameter information: a packet delay budget Packet Delay Budget, a resource type, a priority level, a packet error loss rate, an ARP, an MBR, an AMBR, a GFBR, an MFBR, and the like.

In a second possible implementation, the first node may obtain the feature information of the transmission path and/or the first data flow. The feature information of the transmission path and/or the first data flow may include, but is not limited to the identification information of the transmission path and preprocessing rule information of the transmission path. The preprocessing rule information includes at least timer information. In other words, the timer information is determined by the core network and is indicated to the first node. The first node directly determines the duration of the timer based on the preprocessing rule information.

In a third method, the duration of the timer is determined based on feature information of the split bearer.

A specific implementation process of the foregoing method for determining the duration of the timer is as follows.

Specifically, the UE establishes dual connections to the first node and the second node, and establishes a first radio bearer. The first radio bearer may be an MCG split bearer or an SCG split bearer. The first node determines the first timer duration that is applied to the first radio bearer, for example, determines the first timer duration based on a packet forwarding processing manner, a QoS feature, or the like of the first radio bearer.

S502: Send the duration of the timer to user equipment.

Specifically, the first node sends a message that carries duration information of the timer to the user equipment.

Moreover, in addition to sending the duration information of the timer to the user equipment, the first node may send a triggering condition for starting and/or stopping the timer to the user equipment.

S405: Start a timer if a first operation is performed on the first data on the first transmission branch.

Specifically, performing the first operation on the first data on the first transmission branch is the triggering condition of the timer. The triggering condition may be sent to the user equipment by the first node, or may be locally stored by the user equipment.

Specifically, the first operation may include three possible implementations. For the specific implementations, refer to the description in the previous embodiment.

S406: When timing of the timer ends, determine whether a second operation is performed on the second data on the second transmission branch, and if yes, perform S407; or if no, perform S408.

Specifically, the second operation may include three possible implementations. For the specific implementations, refer to the description in the previous embodiment.

S407: Reset the timer.

Specifically, when the timing of the timer ends, if the second operation has been performed on a second data portion on the second transmission branch, the timer is stopped. This is the triggering condition for stopping the timer. The triggering condition may be sent to the user equipment by the first node, or may be locally stored by the user equipment.

S408: Instruct a lower protocol stack layer of the second transmission branch to perform a third operation on the second data.

Specifically, the third operation may include two possible implementations. For the specific implementations, refer to the description in the previous embodiment.

S409: Instruct a lower protocol stack layer of the second transmission branch to perform a fourth operation on the second data.

Specifically, the fourth operation may include, but is not limited to the following two implementations.

In a first implementation, the fourth operation may be transmitting a backup of the second data to the first transmission branch.

Specifically, the UE may allocate the backup of the second data to the first transmission branch for transmission. For example, the backup of the second data is transmitted to a lower protocol stack layer of the first transmission branch. Specifically, the backup of the second data may be second data stored in a cache at the PDCP layer.

In a second implementation, the fourth operation may be further transmitting the backup of the second data to a third transmission branch.

Specifically, the UE may establish protocol stack layers corresponding to a third transmission branch of the split bearer, where the protocol stack layers include at least a PDCP layer, an RLC layer, and a MAC layer; and allocates the backup of the second data to a lower protocol stack layer of the third transmission branch for transmission, where the lower protocol stack layer includes the RLC layer and/or the MAC layer of the third transmission branch. For example, the second data is transmitted to a lower protocol stack layer of the third transmission branch. Specifically, the backup of the second data may be second data stored in the cache at the PDCP layer. A third node may be a network device, for example, including but not limited to an eNB, a gNB, a TRP, a cell, a CU, or a DU.

According to this embodiment of the present invention, during transmission of the uplink data of the split bearer of the user equipment, when the UE allocates preprocessed data to two transmission branches, and transmission on one transmission branch fails due to channel quality deterioration, the UE can adjust a transmission policy in a timely manner, a transmission time difference between the two transmission branches is controlled by the timer, and the third operation is performed on data on the transmission path. This prevents data from being congested on the transmission branch with worse transmission quality for a long period, thereby improving user experience. Further, after the third operation is performed, the fourth operation may be further performed on the second data, to transmit the backup of the second data to another transmission branch that can transmit data, thereby ensuring that data is normally transmitted to a peer end.

Figure 6:
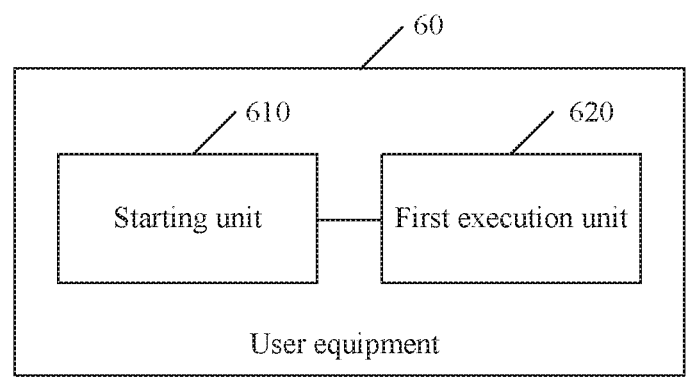
FIG. 6 is a schematic structural diagram of user equipment according to an embodiment of the present invention.

To better understand the uplink data transmission method described in the foregoing embodiments, an embodiment of the present invention correspondingly provides user equipment. As shown in FIG. 6, user equipment 60 establishes protocol stack layers corresponding to a first transmission branch and a second transmission branch of a split bearer, where the protocol stack layers include at least a PDCP layer, an RLC layer, and a MAC layer. The user equipment 60 may include at least a starting unit 610 and an execution unit 620.

The starting unit 610 is configured to start a timer when a first operation is performed on first data on the first transmission branch, where the first data is data that has been transmitted to the RLC layer and/or the MAC layer of the first transmission branch.

The first execution unit 620 is configured to: when timing of the timer ends, if a second operation is not performed on second data on the second transmission branch, perform a third operation on the second data, where the second data is data that has been transmitted to the RLC layer and/or the MAC layer of the second transmission branch.

In a possible embodiment, performing the first operation on the first data on the first transmission branch includes:
  starting transmission of the first data on the first transmission branch; or
  completing transmission of the first data on the first transmission branch; or
  completing transmission of a part of the first data on the first transmission branch.

In a possible embodiment, that the second operation is not performed on the second data on the second transmission branch includes:
  transmission of the second data is not completed on the second transmission branch; or
  transmission of the second data is not started on the second transmission branch; or
  transmission of a part of the second data is not completed on the second transmission branch.

In a possible embodiment, the first execution unit 620 is configured to transmit a backup of the second data to the first transmission branch.

In a possible embodiment, the first execution unit 620 is specifically configured to transmit a backup of the second data to a third transmission branch.

In a possible embodiment, the user equipment 60 further includes a second execution unit 630, configured to cancel transmission of the second data before the first execution unit 620 performs the third operation on the second data; or
  delete the second data; or
  cancel transmission of a part of the second data that has not yet been transmitted; or
  delete a part of the second data that has not yet been transmitted.

In a possible embodiment, the user equipment 60 further includes a resetting unit 640, configured to: when the timing of the timer ends, if the second operation is performed on the second data on the second transmission branch, reset the timer.

In a possible embodiment, the user equipment 60 further includes a receiving unit 650, configured to receive, before the starting unit starts the timer, timer information sent by a network device, where the timer information includes duration information of the timer.

It may be understood that functions of various function modules of the user equipment 60 in this embodiment may be specifically implemented according to the method in the foregoing method embodiments, and details are not described herein again.

Figure 7:
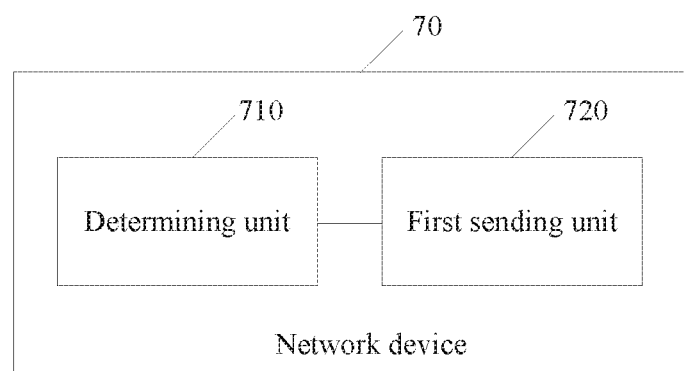
FIG. 7 is a schematic structural diagram of a network device according to an embodiment of the present invention.

An embodiment of the present invention further provides a network device. As shown in FIG. 7, a network device 70 may include at least a determining unit 710 and a first sending unit 720.

The determining unit 710 is configured to determine duration of a timer, where the timer is used for transmission of uplink data of the split bearer of the user equipment 60.

The first sending unit 720 is configured to send the duration of the timer to the user equipment 60, so that the user equipment 60 performs a first operation on first data on a first transmission branch; and after the timer is started, if a second operation is not performed on second data on a second transmission branch before timing of the timer ends, performs a third operation on the second data, where the user equipment 60 establishes protocol stack layers corresponding to the first transmission branch and the second transmission branch of the split bearer; the protocol stack layers include at least a PDCP layer, an RLC layer, and a MAC layer; the first data is data that has been transmitted to a lower protocol stack layer of the first transmission branch; the second data is data that has been transmitted to a lower protocol stack layer of the second transmission branch; and the lower protocol stack layer is the RLC layer and/or the MAC layer.

In a possible embodiment, the determining unit 710 is configured to determine the duration of the timer based on a quality of service parameter of the uplink data; or
  determine the duration of the timer based on a quality of service parameter of a transmission path in which the uplink data is transmitted; or
  determine the duration of the timer based on feature information of the split bearer.

In a possible embodiment, the network device 70 further includes a second sending unit 720, configured to send a triggering condition for starting and/or stopping the timer to the user equipment 70.

In a possible embodiment, performing the first operation on the first data on the first transmission branch includes:
  starting transmission of the first data on the first transmission branch; or
  completing transmission of the first data on the first transmission branch; or completing transmission of a part of the first data on the first transmission branch.

In a possible embodiment, that the second operation is not performed on the second data on the second transmission branch includes:

transmission of the second data is not completed on the second transmission branch; or transmission of the second data is not started on the second transmission branch; or transmission of a part of the second data is not completed on the second transmission branch.

In a possible embodiment, performing the third operation on the second data includes:

canceling transmission of the second data; or deleting the second data; or canceling transmission of a part of the second data that has not yet been transmitted; or deleting a part of the second data that has not yet been transmitted.

It may be understood that functions of various function modules of the network device 70 in this embodiment may be specifically implemented according to the method in the foregoing method embodiments, and details are not described herein again.

Figure 8:
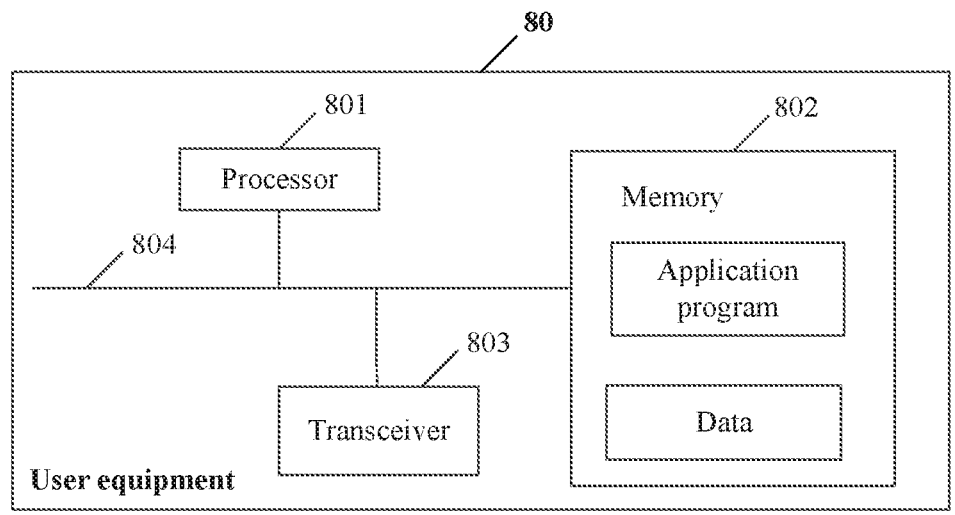
FIG. 8 is a schematic structural diagram of another user equipment according to an embodiment of the present invention.

FIG. 8 is a schematic structural diagram of another user equipment according to an embodiment of the present invention. User equipment 80 establishes protocol stack layers corresponding to a first transmission branch and a second transmission branch of a split bearer, where the protocol stack layers include at least a PDCP layer, an RLC layer, and a MAC layer. The user equipment 80 may include at least a processor 801, a memory 802, and a transceiver 803. The processor 801, the memory 802, and the transceiver 803 are connected to each other through a bus 804.

The memory 802 includes, but is not limited to a random access memory, a read-only memory, an erasable programmable read only memory, or a portable read only memory. The memory 802 is configured to store related instructions and data.

The transceiver 803 may include a receiver and a transmitter, such as a radio frequency module. In the following description, that the processor 801 receives or sends a message may be specifically understood as that the processor 801 receives or sends the message by using the transceiver.

The processor 801 may be one or more central processing units (Central Processing Unit, CPU). When the processor 801 is one CPU, the CPU may be a single-core CPU, or may be a multi-core CPU.

The processor 801 in the user equipment 80 is configured to read program code stored in the memory 802, and perform the following operations:

starting a timer when a first operation is performed on first data on the first transmission branch, where the first data is data that has been transmitted to the RLC layer and/or the MAC layer of the first transmission branch; and when timing of the timer ends, if a second operation is not performed on second data on the second transmission branch, performing a third operation on the second data, where the second data is data that has been transmitted to the RLC layer and/or the MAC layer of the second transmission branch.

In a possible embodiment, performing, by the processor 801, the first operation on the first data on the first transmission branch includes:

starting transmission of the first data on the first transmission branch; or completing transmission of the first data on the first transmission branch; or completing transmission of a part of the first data on the first transmission branch.

In a possible embodiment, that the processor 801 does not perform the second operation on the second data on the second transmission branch includes:

transmission of the second data is not completed on the second transmission branch; or transmission of the second data is not started on the second transmission branch; or transmission of a part of the second data is not completed on the second transmission branch.

In a possible embodiment, performing, by the processor 801, the third operation on the second data includes: transmitting a backup of the second data to the first transmission branch.

In a possible embodiment, performing, by the processor 801, the third operation on the second data includes: transmitting a backup of the second data to a third transmission branch.

In a possible embodiment, before the processor 801 performs the third operation on the second data, the processor 801 is further configured to:

cancel transmission of the second data; or delete the second data; or cancel transmission of a part of the second data that has not yet been transmitted; or delete a part of the second data that has not yet been transmitted.

In a possible embodiment, the processor 801 is further configured to: when the timing of the timer ends, if the second operation is performed on the second data on the second transmission branch, reset the timer.

In a possible embodiment, before the processor 801 starts the timer when the first operation is performed on the first data on the first transmission branch, the processor 801 is further configured to:

receive timer information sent by a network device, where the timer information includes duration information of the timer.

It should be noted that for specific implementations of the operations, reference may be correspondingly made to corresponding descriptions in the method embodiments shown in FIG. 2, FIG. 4, and FIG. 5.

An embodiment of the present invention further provides a chip, including a storage module, a processing module, and a communications interface. The storage module is configured to store an instruction. The processing module is configured to invoke the instruction stored in the storage module, and perform the following operations: starting a timer when a first operation is performed on first data on a first transmission branch; and when timing of the timer ends, if a second operation is not performed on second data on a second transmission branch, performing a third operation on the second data.

An embodiment of the present invention further provides a computer-readable storage medium. The computer-readable storage medium stores a computer program, and the computer program includes a program instruction. When the program instruction is executed by a processor, the following operations are implemented:

starting a timer when a first operation is performed on first data on a first transmission branch; and when timing of the timer ends, if a second operation is not performed on second data on a second transmission branch, performing a third operation on the second data.

The foregoing computer-readable storage medium may be an internal storage unit of the user equipment according to any of the foregoing embodiments, for example, a hard disk or a memory of the user equipment. The foregoing computer-readable storage medium may be alternatively an external storage device of the foregoing user equipment, for example, a plug-connected hard disk, a smart media card (Smart Media Card, SMC), a secure digital (Secure Digital, SD) card, a flash card (Flash Card), or the like equipped on the user equipment. Further, the foregoing computer-readable storage medium may include both the internal storage unit and the external storage device of the user equipment. The foregoing computer-readable storage medium is configured to store the computer program and other programs and data that are necessary for the foregoing user equipment. The foregoing computer-readable storage medium may be further configured to temporarily store output or to-be-output data.

An embodiment of the present invention further provides a computer program. The computer program includes an instruction. When the computer program is executed on a computer, the instruction is used to perform the following operations: starting a timer when a first operation is performed on first data on a first transmission branch; and when timing of the timer ends, if a second operation is not performed on second data on a second transmission branch, performing a third operation on the second data.

An embodiment of the present invention further provides a computer program product that includes a computer program. When the computer program is executed on a computer, the computer is enabled to perform the following operations: starting a timer when a first operation is performed on first data on a first transmission branch; and when timing of the timer ends, if a second operation is not performed on second data on a second transmission branch, performing a third operation on the second data.

Figure 9:
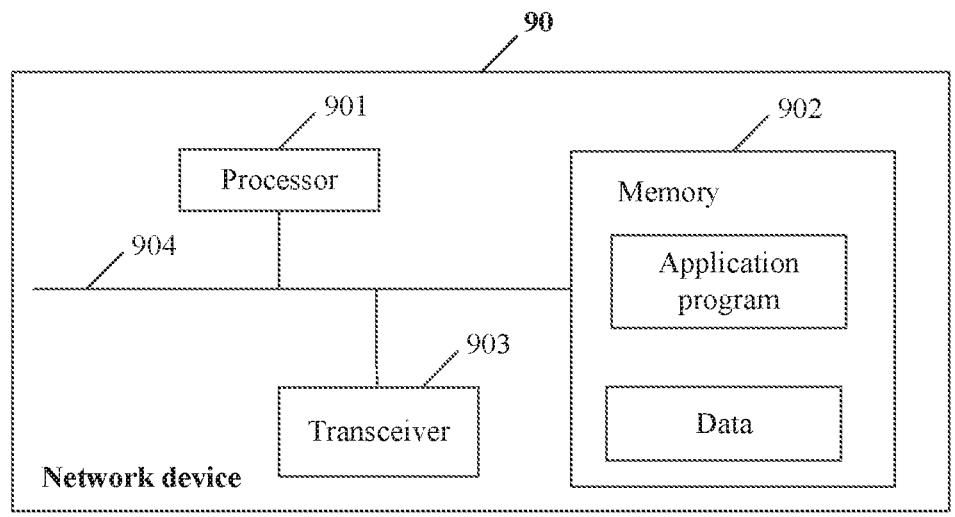
FIG. 9 is a schematic structural diagram of another network device according to an embodiment of the present invention.

FIG. 9 is a schematic structural diagram of another network device according to an embodiment of the present invention. A network device 90 may include at least a processor 901, a memory 902, and a transceiver 903. The processor 901, the memory 902, and the transceiver 903 are connected to each other through a bus 904.

The memory 902 includes, but is not limited to a random access memory, a read-only memory, an erasable programmable read only memory, or a portable read only memory. The memory 902 is configured to store related instructions and data.

The transceiver 903 may include a receiver and a transmitter, such as a radio frequency module. In the following description, that the processor 901 receives or sends a message may be specifically understood as that the processor 901 receives or sends the message by using the transceiver.

The processor 901 may be one or more central processing units (Central Processing Unit, CPU). When the processor 801 is one CPU, the CPU may be a single-core CPU, or may be a multi-core CPU.

The processor 901 in the network device 90 is configured to read program code stored in the memory 902, and perform the following operations:

determining duration of a timer, where the timer is used for transmission of uplink data of the split bearer of the user equipment 80; and sending the duration of the timer to the user equipment 80, so that the user equipment 80 performs a first operation on first data on a first transmission branch, and after the tinier is started, if a second operation is not performed on second data on a second transmission branch before timing of the timer ends, performs a third operation on the second data, where the user equipment 80 establishes protocol stack layers corresponding to the first transmission branch and the second transmission branch of the split bearer; the protocol stack layers include at least a PDCP layer, an RLC layer, and a MAC layer; the first data is data that has been transmitted to a lower protocol stack layer of the first transmission branch; the second data is data that has been transmitted to a lower protocol stack layer of the second transmission branch; and the lower protocol stack layer is the RLC layer and/or the MAC layer.

In a possible embodiment, that the processor 901 is configured to determine duration of a timer includes:

determining the duration of the tinier based on a quality of service parameter of the uplink data; or determining the duration of the timer based on a quality of service parameter of a transmission path in which the uplink data is transmitted; or determining the duration of the timer based on feature information of the split bearer.

In a possible embodiment, the processor 901 is further configured to send a triggering condition for starting and/or stopping the timer to the user equipment.

In a possible embodiment, performing the first operation on the first data on the first transmission branch includes:

starting transmission of the first data on the first transmission branch; or completing transmission of the first data on the first transmission branch; or completing transmission of a part of the first data on the first transmission branch.

In a possible embodiment, that the second operation is not performed on the second data on the second transmission branch includes:

transmission of the second data is not completed on the second transmission branch; or transmission of the second data is not started on the second transmission branch; or transmission of a part of the second data is not completed on the second transmission branch.

In a possible embodiment, performing the third operation on the second data includes:

canceling transmission of the second data; or deleting the second data; or canceling transmission of a part of the second data that has not yet been transmitted; or deleting a part of the second data that has not yet been transmitted.

It should be noted that for specific implementations of the operations, reference may be correspondingly made to corresponding descriptions in the method embodiments shown in FIG. 2, FIG. 4, and FIG. 5.

An embodiment of the present invention further provides a chip, including a storage module, a processing module, and a communications interface. The storage module is configured to store an instruction. The processing module is configured to invoke the instruction stored in the storage module, and perform the following operations: determining duration of a timer, where the timer is used for transmission of uplink data of a split bearer of user equipment; and sending the duration of the timer to the user equipment, so that after the timer is started, if a second operation is not performed on second data on a second transmission branch before timing of the timer ends, the user equipment performs a third operation on the second data.

An embodiment of the present invention further provides a computer-readable storage medium. The computer-readable storage medium stores a computer program, and the computer program includes a program instruction. When the program instruction is executed by a processor, the following operations are implemented:

determining duration of a timer, where the timer is used for transmission of uplink data of a split bearer of user equipment; and sending the duration of the timer to the user equipment, so that after the timer is started, if a second operation is not performed on second data on a second transmission branch before timing of the timer ends, the user equipment performs a third operation on the second data.

The foregoing computer-readable storage medium may be an internal storage unit of the user equipment according to any of the foregoing embodiments, for example, a hard disk or a memory of the user equipment. The foregoing computer-readable storage medium may be alternatively an external storage device of the foregoing user equipment, for example, a plug-connected hard disk, a smart media card (Smart Media Card, SMC), a secure digital (Secure Digital, SD) card, a flash card (Flash Card), or the like equipped on the user equipment. Further, the foregoing computer-readable storage medium may include both the internal storage unit and the external storage device of the user equipment. The foregoing computer-readable storage medium is configured to store the computer program and other programs and data that are necessary for the foregoing user equipment. The foregoing computer-readable storage medium may be further configured to temporarily store output or to-be-output data.

An embodiment of the present invention further provides a computer program. The computer program includes an instruction. When the computer program is executed on a computer, the instruction is used to perform the following operations: determining duration of a timer, where the timer is used for transmission of uplink data of a split bearer of user equipment; and sending the duration of the timer to the user equipment, so that after the timer is started, if a second operation is not performed on second data on a second transmission branch before timing of the timer ends, the user equipment performs a third operation on the second data.

An embodiment of the present invention further provides a computer program product that includes a computer program. When the computer program is executed on a computer, the computer is enabled to perform the following operations: determining duration of a timer, where the timer is used for transmission of uplink data of a split bearer of user equipment; and sending the duration of the timer to the user equipment, so that after the timer is started, if a second operation is not performed on second data on a second transmission branch before timing of the timer ends, the user equipment performs a third operation on the second data.

It should be understood that the numbers such as "first" and "second" used in the present invention are merely for distinguishing for ease of description, and are not intended to limit the scope of this application.

It should be understood that the term "and/or" in the present invention describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that sequence numbers of the foregoing processes do not mean execution sequences in various embodiments of the present invention. The execution sequences of the processes should be determined according to functions and internal logic of the processes, and should not be construed as any limitation on the implementation processes of the embodiments of this application.

Persons of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraints of the technical solutions. Persons skilled in the art may use different methods to implement the described functions for each particular application, but it should not be considered that the implementation goes beyond the scope of this application.

A sequence of the steps of the methods in the embodiments of the present invention may be adjusted, combined, or deleted based on an actual requirement.

The modules in the apparatus in the embodiments of the present invention may be combined, divided, or removed based on an actual requirement.

The foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of the present invention.

What is claimed is:

1. An uplink data transmission method applied to a user equipment, the uplink data transmission method comprising:
   establishing first protocol stack layers corresponding to a first transmission branch and second protocol stack layers corresponding to a second transmission branch of a split bearer, wherein the first protocol stack layers comprise at least one of a first Packet Data Convergence Protocol (PDCP) layer, a first radio link control (RLC) layer, or a first medium access control (MAC) layer, and wherein the second protocol stack layers comprise at least one of a second PDCP layer, a second RLC layer, or a second MAC layer;
   starting a timer when a first operation is performed on first data on the first transmission branch, wherein the first data is transmitted to the first RLC layer or the first MAC layer of the first transmission branch;
   identifying that a second operation is not performed on second data on the second transmission branch when timing of the timer ends, wherein the second data is transmitted to the second RLC layer or the second MAC layer of the second transmission branch;
   performing a third operation on the second data in response to the second operation not being performed;
   identifying that the second operation is performed on the second data on the second transmission branch when the timing of the timer ends; and
   resetting the timer.

2. The uplink data transmission method of claim 1, further comprising:
   starting transmission of the first data on the first transmission branch;

completing transmission of the first data on the first transmission branch; or completing transmission of a part of the first data on the first transmission branch.

3. The uplink data transmission method of claim 1, wherein identifying that the second operation is not performed on the second data on the second transmission branch comprises:

transmission of the second data is not completed on the second transmission branch;

transmission of the second data is not started on the second transmission branch; or transmission of a part of the second data is not completed on the second transmission branch.

4. The uplink data transmission method of claim 1, further comprising:

cancelling transmission of the second data;

deleting the second data;

cancelling transmission of a part of the second data that has not yet been transmitted; or deleting the part of the second data that has not yet been transmitted.

5. The uplink data transmission method of claim 4, wherein after performing the third operation on the second data, the uplink data transmission method further comprises transmitting a backup of the second data to the first transmission branch.

6. The uplink data transmission method of claim 4, further comprising:

establishing third protocol stack layers corresponding to a third transmission branch of the split bearer, wherein the third protocol stack layers comprise at least one of a third PDCP layer, a third RLC layer, or a third MAC layer; and transmitting a backup of the second data to the third transmission branch after performing the third operation on the second data.

7. The uplink data transmission method of claim 1, wherein before starting the timer and performing the first operation, the uplink data transmission method further comprises receiving timer information from a network device, and wherein the timer information comprises duration information of the timer.

8. A user equipment, comprising:

a transceiver; and a processor coupled to the transceiver and configured to:

establish, using the transceiver, first protocol stack layers corresponding to a first transmission branch and second protocol stack layers corresponding to a second transmission branch of a split bearer, wherein the first protocol stack layers comprise at least one of a first Packet Data Convergence Protocol (PDCP) layer, a first radio link control (RLC) layer, or a first medium access control (MAC) layer, and wherein the second protocol stack layers comprise at least one of a second PDCP layer, a second RLC layer, or a second MAC layer;

start a timer when a first operation is performed on first data on the first transmission branch, wherein the first data is transmitted to the first RLC layer or the first MAC layer of the first transmission branch;

identify that a second operation is not performed on second data on the second transmission branch when timing of the timer ends, wherein the second data is transmitted to the second RLC layer or the second MAC layer of the second transmission branch;

perform a third operation on the second data in response to not performing the second operation on the second data;

identify that the second operation is performed on the second data on the second transmission branch when the timing of the timer ends; and reset the timer.

9. The user equipment of claim 8, wherein the processor is further configured to:

start, using the transceiver, transmission of the first data on the first transmission branch;

complete, using the transceiver, transmission of the first data on the first transmission branch; or complete, using the transceiver, transmission of a part of the first data on the first transmission branch.

10. The user equipment of claim 8, wherein when identifying that the second operation is not performed on the second data, the processor is further configured to:

transmission of the second data is not completed on the second transmission branch;

transmission of the second data is not started on the second transmission branch; or transmission of a part of the second data is not completed on the second transmission branch.

11. The user equipment of claim 8, wherein after identifying that the second operation is not performed on the second data when timing of the timer ends, the processor is further configured to:

cancel transmission of the second data;

delete the second data;

cancel transmission of a part of the second data that has not yet been transmitted; or delete the part of the second data that has not yet been transmitted.

12. The user equipment of claim 11, wherein the processor is further configured to transmit, using the transceiver, a backup of the second data to the first transmission branch after performing the third operation on the second data.

13. The user equipment of claim 11, wherein the processor is further configured to:

establish third protocol stack layers corresponding to a third transmission branch of the split bearer, wherein the third protocol stack layers comprise at least one of a third PDCP layer, a third RLC layer, or third a MAC layer; and transmit, using the transceiver, a backup of the second data to the third transmission branch after performing the third operation on the second data.

14. The user equipment of claim 8, wherein the processor is further configured to receive, using the transceiver, timer information from a network device before starting the timer.

15. The user equipment of claim 14, wherein the timer information comprises duration information of the timer.

16. A computer program product comprising computer-executable instructions stored on a non-transitory computer-readable medium that, when executed by a processor, cause a user equipment to:

establish first protocol stack layers corresponding to a first transmission branch and second protocol stack layers corresponding to a second transmission branch of a split bearer, wherein the first protocol stack layers comprise at least one of a first Packet Data Convergence Protocol (PDCP) layer, a first radio link control (RLC) layer, or a first medium access control (MAC) layer, and wherein the second protocol stack layers comprise at least one of a second PDCP layer, a second RLC layer, or a second MAC layer;

start a timer when a first operation is performed on first data on the first transmission branch, wherein the first data is transmitted to the first RLC layer or the first MAC layer of the first transmission branch;

identify that a second operation is not performed on second data on the second transmission branch when timing of the timer ends, wherein the second data is transmitted to the second RLC layer or the second MAC layer of the second transmission branch;

perform a third operation on the second data in response to the second operation not being performed;

identify that the second operation is performed on the second data on the second transmission branch when the timing of the timer ends; and reset the timer.

17. The computer program product of claim 16, wherein the instructions further cause the user equipment to:

start transmission of the first data on the first transmission branch;

complete transmission of the first data on the first transmission branch; or complete transmission of a part of the first data on the first transmission branch.

18. The computer program product of claim 16, wherein identifying that the second operation is not performed on the second data on the second transmission branch comprises:

transmission of the second data not being completed on the second transmission branch;

transmission of the second data not being started on the second transmission branch; or transmission of a part of the second data not being completed on the second transmission branch.

19. The computer program product of claim 16, wherein the instructions further cause the user equipment to:

cancel transmission of the second data;

delete the second data;

cancel transmission of a part of the second data that has not yet been transmitted; or delete the part of the second data that has not yet been transmitted.

20. The computer program product of claim 19, wherein after performing the third operation on the second data, the instructions further cause the user equipment to transmit a backup of the second data to the first transmission branch.

\* \* \* \* \*